US010917895B2

(12) United States Patent
Tang et al.

(10) Patent No.: US 10,917,895 B2
(45) Date of Patent: Feb. 9, 2021

(54) POWER CONTROL METHOD AND APPARATUS

(71) Applicant: Huawei Technologies Co., Ltd., Shenzhen (CN)

(72) Inventors: Xiaoyong Tang, Shenzhen (CN); Qiqi Mao, Chengdu (CN); Huang Huang, Shenzhen (CN); Yalin Liu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/523,709

(22) Filed: Jul. 26, 2019

(65) Prior Publication Data
US 2019/0349940 A1    Nov. 14, 2019

Related U.S. Application Data (63) Continuation of application No. PCT/CN2018/074226, filed on Jan. 26, 2018.

(30) Foreign Application Priority Data

Jan. 26, 2017 (CN) .......................... 2017 1 0061835
Mar. 24, 2017 (CN) .......................... 2017 1 0184893

(51) Int. Cl.
*H04W 72/04* (2009.01)
*H04W 52/24* (2009.01)
(Continued)

(52) U.S. Cl.
CPC ..... *H04W 72/0473* (2013.01); *H04W 52/243* (2013.01); *H04W 52/30* (2013.01); *H04W 52/42* (2013.01); *H04W 72/046* (2013.01)

(58) Field of Classification Search
CPC . H04W 72/042; H04W 72/046; H04W 16/28; H04W 52/146; H04W 52/42; H04W 52/30
See application file for complete search history.

(56) References Cited

U.S. PATENT DOCUMENTS

2009/0252052 A1    10/2009  Sambhwani et al.
2010/0246561 A1    9/2010   Shin et al.
(Continued)

FOREIGN PATENT DOCUMENTS

| CN | 101983529 A | 3/2011 |
| CN | 102356675 A | 2/2012 |

(Continued)

OTHER PUBLICATIONS

"3rd Generation Partnership Project; Technical Specification Group Radio Access Network; Evolved Universal Terrestrial Radio Access (E-UTRA); Multiplexing and Channel Coding (Release 14)," 3GPP TS 36.212, V14.1.0, pp. 1-176, 3rd Generation Partnership Project, Valbonne, France (Dec. 2016).

(Continued)

*Primary Examiner* — Keith Ferguson
(74) *Attorney, Agent, or Firm* — Leydig, Voit & Mayer, Ltd.

(57) ABSTRACT

An embodiment of this application provides a power control method. The method includes: receiving, by a first node from a second node, first power control information associated with a first resource pair link; and sending, by the first node, a first signal to the second node by using a first transmission resource corresponding to the first resource pair link, where transmit power of the first signal is obtained based on the first power control information. An association relationship is established between power control and a resource pair link, so that power control on a resource pair link granularity can be implemented, different power control (Continued)

can be performed based on different channel features, and more accurate transmit power is obtained. In addition, various signals are transmitted on resources corresponding to different resource pair links, so that different power control values can be set for the various signals. In this way, interference can be reduced while correct reception is performed, and a significant gain may be made on network communication quality.

18 Claims, 4 Drawing Sheets

(51) Int. Cl.
  *H04W 52/30* (2009.01)
  *H04W 52/42* (2009.01)

(56) References Cited

U.S. PATENT DOCUMENTS

| | | | |
|---|---|---|---|
| 2013/0182683 A1* | 7/2013 | Seol | H04B 7/0695 370/335 |
| 2013/0294381 A1* | 11/2013 | Wang | H04L 5/0051 370/329 |
| 2014/0016576 A1* | 1/2014 | Noh | H04L 5/0048 370/329 |
| 2014/0185481 A1* | 7/2014 | Seol | H04W 52/24 370/252 |
| 2015/0181533 A1 | 6/2015 | Chen et al. | |
| 2016/0219569 A1* | 7/2016 | Kuo | H04W 74/0833 |
| 2017/0207843 A1* | 7/2017 | Jung | H04W 74/004 |
| 2017/0317866 A1* | 11/2017 | Stirling-Gallacher | H04L 5/1469 |

FOREIGN PATENT DOCUMENTS

| | | |
|---|---|---|
| CN | 105830508 A | 8/2016 |
| EP | 3185437 A1 | 6/2017 |
| JP | 2016536847 A | 11/2016 |
| KR | 20140060485 A | 5/2014 |
| WO | 2014175664 A1 | 10/2014 |
| WO | 2016032104 A1 | 3/2016 |

OTHER PUBLICATIONS

"3rd Generation Partnership Project; Technical Specification Group Radio Access Network; Evolved Universal Terrestrial Radio Access (E-UTRA); Physical Channels and Modulation (Release 13)," 3GPP TS 36.211, V13.0.0, pp. 1-141, 3rd Generation Partnership Project, Valbonne, France (Dec. 2015).
"Discussion on Beam Management Aspects for UL MIMO," 3GPP TSG RAN WG1 NR Ad Hoc Meeting, Spokane, USA, R1-1700043, pp. 1-4, 3rd Generation Partnership Project, Valbonne, France (Jan. 16-20, 2017).
"On Robust Beam Management," 3GPP TSG-RAN WG1 #87ah-NR ,Spokane, WA, USA, R1-1700748, pp. 1-3, 3rd Generation Partnership Project, Valbonne, France (Jan. 16-20, 2017).
"On UL Beam Management," 3GPP TSG-RAN WG1 #87ah-NR, Spokane, WA, USA, R1-1700749, pp. 1-3, 3rd Generation Partnership Project, Valbonne, France (Jan. 16-20, 2017).
"Discussion on Beam Management Aspects for UL MIMO," 3GPP TSG RAN WG1 Meeting #88, Athens, Greece, R1-1701718, pp. 1-4, 3rd Generation Partnership Project, Valbonne, France (Feb. 13-17, 2017).
"SRS Transmission for Beam Management," 3GPP TSG RAN WG1 Meeting #88, Athens, Greece, R1-1703170, pp. 1-2, 3rd Generation Partnership Project, Valbonne, France (Feb. 13-17, 2017).
"3rd Generation Partnership Project; Technical Specification Group Radio Access Network; Evolved Universal Terrestrial Radio Access (E-UTRA); Physical Layer Procedures (Release 14)," 3GPP TS 36.213, V14.1.0, pp. 1-414, 3rd Generation Partnership Project, Valbonne, France (Dec. 2016).
"Way Forward on QCL in NR," 3GPP TSG RAN WG1 Meeting #87, Reno, USA, R1-1613719, pp. 1-3, 3rd Generation Partnership Project, Valbonne, France (Nov. 14-18, 2016).
"3rd Generation Partnership Project; Technical Specification Group Radio Access Network; Evolved Universal Terrestrial Radio Access (E-Utra); Physical Layer Procedures (Release 14)," 3GPP TS 36.213, V14.0.0, pp. 1-406, 3rd Generation Partnership Project, Valbonne, France (Sep. 2016).
"WF on the Antenna Ports QCL in NR," 3GPP TSG-RAN1 Meeting #86, Gothenburg, Sweden, R1-167970, pp. 1-4, 3rd Generation Partnership Project, Valbonne, France (Aug. 22-26, 2016).
"Final Report of 3GPP TSG RAN WG1 #86 v1.0.0 (Gothenburg, Sweden, Aug. 22-26, 2016)," 3GPP TSG RAN WG1 Meeting #86bis, Lisbon, Portugal, R1-1608562, pp. 1-154, 3rd Generation Partnership Project, Valbonne, France (Oct. 10-14, 2016).
"WF on QCL Assumptions and Configurations in NR," 3GPP TSG RAN WG1 Meeting #86, Gothenburg, Sweden, R1-168436, pp. 1-3, 3rd Generation Partnership Project, Valbonne, France (Aug. 22-26, 2016).
"Discussion on Beam Management Aspects for UL MIMO," 3GPP TSG RAN WG1 Meeting #86bis, Lisbon, Portugal, R1-1609415, pp. 1-4, 3rd Generation Partnership Project, Valbonne, France (Oct. 10-14, 2016).
"WF on the QCL for NR," 3GPP TSG RAN WG1 Meeting #86bis, Lisbon, Portugal, R1-1610520, pp. 1-2, 3rd Generation Partnership Project, Valbonne, France (Oct. 10-14, 2016).
"WF on Beam Management," 3GPP TSG RAN WG1 Meeting #86bis, Lisbon, Portugal, R1-1610539, Version 2, pp. 1-5, 3rd Generation Partnership Project, Valbonne, France (Oct. 10-14, 2016).
"WF on Spatial QCL Parameters for NR," 3GPP TSG-RAN WG1 #87, Reno, USA, R1-1613108, pp. 1-2, 3rd Generation Partnership Project, Valbonne, France (Nov. 14-18, 2016).
"Uplink Power Control for MIMO," 3GPP TSG RAN WG1 NR Ad-Hoc Meeting, Spokane, USA, R1-1701109, pp. 1-6, 3rd Generation Partnership Project, Valbonne, France (Jan. 16-20, 2017).
"WF on Beam Management," 3GPP TSG RAN WG1 Meeting #86bis, Lisbon, Portugal, R1-1610825, Version 4, pp. 1-5, 3rd Generation Partnership Project, Valbonne, France (Oct. 10-14, 2016).
"3rd Generation Partnership Project; Technical Specification Group Radio Access Network; Evolved Universal Terrestrial Radio Access (E-UTRA); Physical layer procedures (Release 14)," 3GPP TS 36.213 V14.2.0, XP051291434, pp. 8-49, 3rd Generation Partnership Project, Valbonne, France (Mar. 2017).
EP/18745163.8-1205, Office Action, dated Jun. 23, 2020.
EP/18745163.8-1205, Office Action, dated Oct. 10, 2020.
"UL Power Control tor MIMO," 3GPP TSG HAN WG1 Meeting #88, Athens, Greece, R1-1703185, pp. 1-6, 3rd Generation Partnership Project, Valbonne, France (Feb. 13-17, 2017).
"Detailed considerations on UL power control design for NR," 3GPP TSG RAN WG1 Meeting #88, Athens, Greece, R1-1701688, pp. 1-4, 3rd Generation Partnership Project, Valbonne, France (Feb. 13-17, 2017).
IN/201917026683, Examination Report, dated Nov. 2, 2020.

\* cited by examiner

POWER CONTROL METHOD AND APPARATUS

CROSS-REFERENCE TO RELATED APPLICATIONS

This application is a continuation of International Application No. PCT/CN2018/074226, filed on Jan. 26, 2018, which claims priority to Chinese Patent Application No. 201710061835.1, filed on Jan. 26, 2017 and Chinese Patent Application No. 201710184893.3, filed on Mar. 24, 2017. The disclosures of the aforementioned applications are hereby incorporated by reference in their entireties.

TECHNICAL FIELD

Embodiments of this application relate to communications technologies, and in particular, to a power control technology.

BACKGROUND

Figure 1:
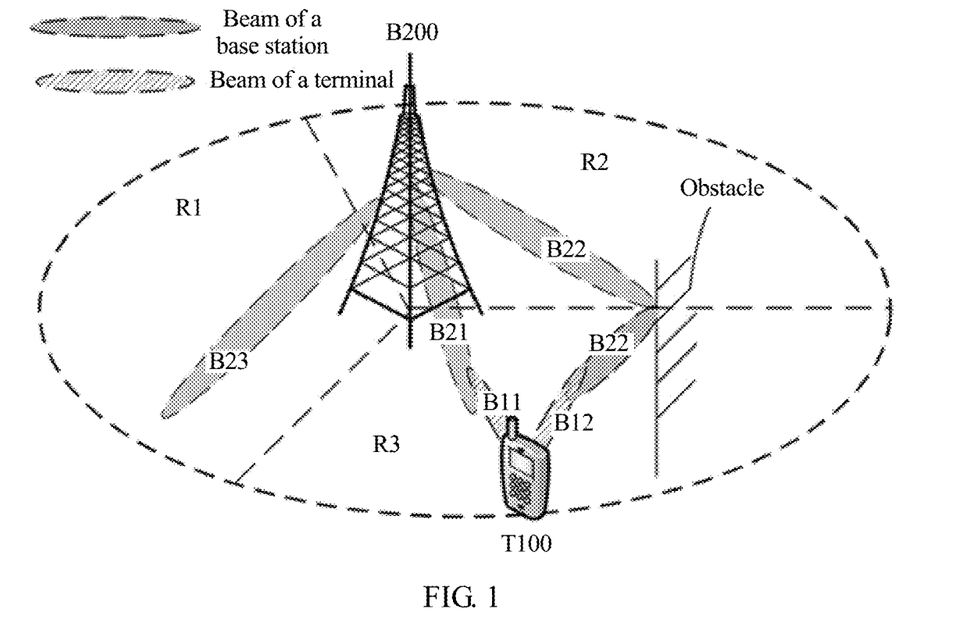
FIG. 1 is a simplified schematic diagram of a wireless communications system.

In a wireless communications system, a base station may use an omnidirectional antenna to form signal coverage in a shape similar to a circle, or may use a directional antenna with sector radiation to form signal coverage in a shape similar to a sector. As shown in FIG. 1, signal coverage of a base station B200 is divided into three sectors: R1, R2, and R3. A coverage angle of each sector is 120 degrees. In other words, the base station B200 uses directional antennas to form three wide beams in a shape similar to a sector. Usually, directions and a quantity of wide beams of a base station do not vary with a moment.

Transmit power of a signal needs to be considered during signal transmission between a base station and a terminal. Excessively low transmit power may cause a signal reception failure of a receiver, and excessively high transmit power may cause interference. To determine appropriate transmit power, the base station may send power control information to the terminal.

With development of technologies, a beam formed by using a beamforming technology may be used in the wireless communications system to obtain relatively long-distance signal coverage. The beamforming technology is mostly used for high frequency resources, and may also be used for low frequency resources. As shown in FIG. 1, the base station B200 may enable, by using the beamforming technology, high frequency signals to form signal coverage in a shape similar to a narrow beam. The signal coverage is briefly referred to as a narrow beam, for example, B21, B22, and B23. A narrow beam is also directional, and a coverage area of the narrow beam is narrower than a coverage area of a wide beam. At a same moment, the base station may transmit one narrow beam or more different narrow beams for communication. At different moments, quantities and directions of narrow beams transmitted by the base station may be different. For example, the base station B200 transmits beams B21 and B22 at a moment T1, and transmits a beam B23 at a moment T2. The base station may communicate with a terminal at a same moment by using one or more narrow beams. For example, the base station B200 may send a communication signal to a terminal T100 by using B21 and B22 (for example, B22 can still be received by the terminal T100 after B22 is reflected by an obstacle). The terminal T100 may also send a communication signal to the base station B200 by using beams B11 and B12. Different narrow beams may be used to send different information, or may be used to send same information.

When communication is performed by using a narrow beam, how to obtain appropriate transmit power is a problem that needs to be resolved.

SUMMARY

Embodiments of this application provide a power control method, a node, a communications system, a computer program product, a computer readable storage medium, and a control signal, to obtain appropriate transmit power.

According to a first aspect, an embodiment of this application provides a power control method, including: receiving, by a first node, first power control information from a second node, where the first power control information is associated with a first resource pair link; and sending, by the first node, a signal to the second node by using a resource corresponding to the first resource pair link. Transmit power of the signal is obtained based on the first power control information.

According to this method, resources corresponding to different resource pair links have different channel features. Therefore, in this method, power control information is associated with a resource pair link, so that power control can be matched with a channel feature. In this way, matched power control can be used for different channel features, and more accurate transmit power is obtained.

Optionally, the first power control information may be obtained based on signal quality of the signal that is previously sent on the resource corresponding to the first resource pair link. The power control information obtained based on the signal quality is more accurate.

Optionally, the resource pair link may be a beam pair link or a port pair link. The radio resource may be a beam or a port. The signal may be a reference signal, a control signal, or a data signal. Different types of signals may be transmitted by using different resource pair links, so that different power control can be performed on different types of signals, thereby reducing interference and improving network transmission quality.

Optionally, when receiving the first power control information from the second node, the first node may further receive identification information of the first resource pair link from the second node. The first resource pair link may be identified based on the identification information of the first resource pair link. There are a plurality of forms of identification information of a resource pair link, such as an index of the resource pair link, an index of a resource corresponding to the resource pair link, an index of the resource pair link that has a QCL relationship, and an index of a resource that has a QCL relationship.

Optionally, control information may be used to carry the first power control information and the identification information of the first resource pair link.

Optionally, the first node may further receive, from the second node, new first power control information associated with the first resource pair link. Optionally, the first node may delete the old first power control information. Optionally, the first node may locally store a plurality of pieces of power control information associated with the first resource pair link. Optionally, the first node may locally store power control information associated with each of a plurality of resource pair links.

According to a second aspect, an embodiment of this application further provides a power control method, including: sending, by a second node to a first node, first power control information associated with a first resource pair link; and receiving, by the second node, a first signal from the first node by using a first receiving resource corresponding to the first resource pair link. The first power control information may be used to obtain transmit power of the first signal.

According to this method, the second node may control transmit power of the first node. In this method, power control information is associated with a resource pair link, so that power control can be matched with a channel feature. In this way, matched power control can be used for different channel features, and more accurate transmit power is obtained.

Optionally, when sending the first power control information to the first node, the second node may further send, to the first node, identification information of the first resource pair link. The first resource pair link may be identified based on the identification information of the first resource pair link.

Optionally, the second node may further send, to the first node, new first power control information associated with the first resource pair link.

Optionally, the first node may further receive, from the second node, the new first power control information associated with the first resource pair link. Optionally, the first node may delete the old first power control information. Optionally, the first node may locally store a plurality of pieces of power control information associated with the first resource pair link. Optionally, the first node may locally store power control information associated with each of a plurality of resource pair links. Optionally, the second node may locally store power control information associated with each of a plurality of resource pair links.

Optionally, for how to obtain more accurate first power control information, description of a resource pair link, description of a resource, description of a signal, description of identification information of a resource pair link, and for how to transmit the first power control information and the identification information of the first resource pair link, refer to the first aspect.

According to a third aspect, an embodiment of this application provides a node. The node may be configured to implement the method in the first aspect. The node may be a terminal.

In an optional design, the node includes a processor and a transceiver. The processor is configured to: receive first power control information from a second node by using the transceiver, where the first power control information is associated with a first resource pair link; and send a signal to the second node by using a resource corresponding to the first resource pair link. Transmit power of the signal is obtained based on the first power control information.

In another optional design, the node includes a processor and a memory. The memory is configured to store a program for implementing the method in the first aspect, and the processor is configured to run the program to implement the method in the first aspect.

For how the node implements the method in the first aspect, refer to content of the first aspect.

According to a fourth aspect, an embodiment of this application provides a node. The node may be configured to implement the method in the second aspect. The node may be a base station.

In an optional design, the node includes a processor and a transceiver. The processor sends, to a first node by using the transceiver, first power control information associated with a first resource pair link, and receives a first signal from the first node by using a first receiving resource corresponding to the first resource pair link. The first power control information may be used to obtain transmit power of the first signal.

In another optional design, the node includes a processor and a memory. The memory is configured to store a program for implementing the method in the second aspect, and the processor is configured to run the program to implement the method in the second aspect.

For how the node implements the method in the second aspect, refer to content of the second aspect.

According to a fifth aspect, an embodiment of this application provides a communications system, configured to include the foregoing two nodes.

According to a sixth aspect, an embodiment of this application further provides a computer program product, and the program product includes a program for implementing the method in the first aspect.

According to a seventh aspect, an embodiment of this application further provides a computer readable storage medium, and the medium stores the program in the sixth aspect.

According to an eighth aspect, an embodiment of this application further provides a computer program product, and the program product includes a program for implementing the method in the second aspect.

According to a ninth aspect, an embodiment of this application further provides a computer readable storage medium, and the medium stores the program in the eighth aspect.

According to a tenth aspect, an embodiment of this application further provides control information. The control information includes identification information of a resource pair link and power control information corresponding to the resource pair link.

According to an eleventh aspect, an embodiment of this application further provides a signal transmission method, including:

obtaining, by a terminal, first transmit power; and sending, by the terminal, a signal to a base station by using one or more transmission resources, where transmit power of the one or more transmission resources is equal to the first transmit power.

Optionally, the signal is an SRS.

Optionally, the plurality of transmission resources are same transmission resources.

Optionally, the plurality of transmission resources are different transmission resources.

Optionally, the method further includes: receiving, by the terminal, configuration information from the base station, where the configuration information is used to instruct to perform resource scanning.

Optionally, the obtaining, by a terminal, first transmit power is: obtaining, by the terminal, maximum transmit power of the terminal. That the transmit power of the one or more transmission resources is equal to the first transmit power is that the transmit power of the one or more transmission resources is equal to the maximum transmit power.

Optionally, the obtaining, by a terminal, first transmit power is: receiving, by the terminal, the first transmit power from the base station.

Optionally, the method further includes: receiving, by the terminal from the base station, a power parameter associated with a resource pair link. The obtaining, by a terminal, first transmit power is: obtaining, by the terminal, the first transmit power based on the power parameter.

Optionally, the power parameter may be one or more of $P_{O\_SRS,BPL}(m)$, $\alpha_{SRS,BPL}$, $f_{SRS,BPL}$, and $PL_{BPL}$.

Optionally, the obtaining, by the terminal, the first transmit power based on the power parameter is:

obtaining, by the terminal, the first transmit power based on $$P_{SRS,c}(i)=\min\{P_{CMAX,c}(i), 10\log_{10}(M_{SRS,c})+P_{O\_SRS,c}(m)+\alpha_{SRS,c}\cdot PL_c\}$$

or $$P_{SRS,c}(i)=\min\{P_{CMAX,c}(i), 10\log_{10}(M_{SRS,c})+P_{O\_SRS,c}(m)+\alpha_{SRS,c}\cdot PL_c+f_{SRS,c}(i)\}.$$

According to a twelfth aspect, an embodiment of this application provides a signal transmission method, including:

sending, by a base station, first transmit power or a power parameter associated with the first transmit power to a terminal; and receiving, by the base station, a signal from the terminal by using one or more receiving resources.

The signal is sent by using one or more transmission resources, and transmit power of the one or more transmission resources is the first transmit power.

Optionally, the signal is an SRS.

Optionally, the plurality of transmission resources are same transmission resources.

Optionally, the plurality of transmission resources are different transmission resources.

Optionally, the plurality of receiving resources are same receiving resources.

Optionally, the plurality of receiving resources are different receiving resources.

Optionally, the method further includes: sending, by the base station, configuration information to the terminal, where the configuration information is used to instruct to perform resource scanning.

Optionally, the power parameter may be one or more of $P_{O\_SRS,BPL}(m)$ $\alpha_{SRS,BPL}$, $f_{SRS,BPL}$, and, $PL_{BPL}$.

Optionally, the resource may be a beam.

Optionally, the resource pair link may be a BPL.

According to a thirteenth aspect, an embodiment of this application provides a terminal. The terminal may be configured to implement the method in the eleventh aspect.

In an optional design, the terminal includes a processor and a transceiver.

In another optional design, the terminal includes a processor and a memory. The memory is configured to store a program for implementing the method in the eleventh aspect, and the processor is configured to run the program to implement the method in the eleventh aspect.

For how the node implements the method in the eleventh aspect, refer to content of the eleventh aspect.

According to a fourteenth aspect, an embodiment of this application provides a base station. The base station may be configured to implement the method in the twelfth aspect.

In an optional design, the base station includes a processor and a transceiver.

In another optional design, the base station includes a processor and a memory. The memory is configured to store a program for implementing the method in the twelfth aspect, and the processor is configured to run the program to implement the method in the twelfth aspect.

For how the base station implements the method in the twelfth aspect, refer to content of the twelfth aspect.

According to a fifteenth aspect, an embodiment of this application provides a communications system, configured to include the foregoing base station and the foregoing terminal.

According to a sixteenth aspect, an embodiment of this application further provides a computer program product, and the program product includes a program for implementing the method in the eleventh aspect.

According to a seventeenth aspect, an embodiment of this application further provides a computer readable storage medium, and the medium stores the program in the sixteenth aspect.

According to an eighteenth aspect, an embodiment of this application further provides a computer program product, and the program product includes a program for implementing the method in the twelfth aspect.

According to a nineteenth aspect, an embodiment of this application further provides a computer readable storage medium, and the medium stores the program in the eighteenth aspect.

In the technical solutions of this application, an association relationship is established between power control and a resource pair link, so that power control on a resource pair link granularity can be implemented, different power control can be performed based on different channel features, and more accurate transmit power is obtained. In addition, various signals are transmitted on resources corresponding to different resource pair links, so that different power control values can be set for the various signals. In this way, interference can be reduced while correct reception is performed, and a significant gain may be made on network communication quality.

DESCRIPTION OF DRAWINGS

To describe the technical solutions in the embodiments of this application more clearly, the following briefly describes the accompanying drawings required for describing the embodiments.

DESCRIPTION OF EMBODIMENTS

The following describes the embodiments of this application with reference to the accompanying drawings in this application.

Some terms and agreements in this application are described below.

In this application, a signal is an expression form of information. The signal may be sometimes referred to as a radio signal or a communication signal. In wireless communication, a signal may be sent by one communications node to another communications node in an electromagnetic wave manner. There may be a plurality of types of signals based on different information content. For example, signals may be classified into a reference signal, a control signal, and a data signal. The reference signal is a signal used for channel estimation, channel sounding, or channel demodulation. For example, a sounding reference signal (SRS) may be classified as the reference signal. The control signal is a signal used to control a communication behavior of a communications node. For example, a signal sent over a control channel may be classified as the control signal. The data signal is a signal that represents data information. For example, a signal of service data sent over a data channel may be classified as the data signal.

In this application, a communication feature refers to information used to represent a transmission characteristic. For example, the communication feature may include an average gain, an average delay, delay distribution, a Doppler frequency shift, Doppler distribution, and the like.

In this application, a channel feature refers to information used to represent a channel transmission characteristic. For example, the channel feature may include channel attenuation, channel noise, a channel interference level, channel multipath distribution, a channel Doppler frequency shift, channel angular spread, a channel propagation delay, and the like.

In this application, a communication resource may be briefly referred to as a resource. The communication resource may be used to transmit a signal. There are a plurality of types of communication resources. For example, from a perspective of physical characteristics, the communication resources may be classified into a space resource, a time domain resource, and a frequency domain resource. For example, from a perspective of different representations, the communication resources may be classified into a beam, a port, and the like. A set of communication resources of different types also refers to a type of communication resource. For example, a time-frequency resource is a type of communication resource, and a combination of the beam and the port is a type of communication resource.

In this application, the beam is a type of communication resource. The beam may be a wide beam, a narrow beam, or a beam of another type. A technology for forming a beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams that have a same or similar communication feature may be considered as one beam.

In this application, an antenna port is a type of communication resource. The antenna port may be briefly referred to as a port. The port may be a logical port or a physical port. Different ports may be considered as different resources. Same information or different information may be sent through different ports. Optionally, a plurality of ports that have a same or similar communication feature may be considered as one port.

In this application, a communication resource used to receive a signal may be referred to as a receiving resource, and a communication resource used to send a signal may be referred to as a transmission resource. For example, a receive beam is a receiving resource, and a transmit beam is a transmission resource; and a receive port is a receiving resource, and a transmit port is a transmission resource.

In this application, one receiving resource and one transmission resource may be considered as one resource pair. For example, one receive beam and one transmit beam may form a beam pair; and one transmit port and one receive port may form a port pair. Path space for wireless signal transmission may be referred to as a link. Path space in which a radio signal is transmitted by using a resource pair may be referred to as a resource pair link. For example, path space in which a signal is transmitted by using a beam pair may be referred to as a beam pair link (BPL); and path space in which a signal is transmitted by using a port pair may be referred to as a port pair link. The resource pair link may correspond to the channel feature. Different resource pair links may have different channel features. In this application, the resource pair link may be considered as a communication feature. For related content of the beam pair link, refer to related content in Proposal R1-1700748 of the 3rd generation partnership project (3GPP).

In this application, a quasi co-location (QCL) relationship is used to indicate that a plurality of resources have one or more same or similar communication features. Same or similar communication configurations may be used for the plurality of resources that have the quasi co-location relationship. For example, for two beams that have the QCL relationship, it may be considered that beam pair links of the two beams are the same or similar, and same or similar power control may be performed. For related content of the QCL, refer to related content of the 3GPP proposals R1-167970, R1-168436, R1-1610825, R1-1610520, R1-1613719, and R1-1613108, and content of Section 6.2.1 in the 3GPP standard TS 36.211 v13.0.0 and content of Section 7.1.9 and Section 7.1.10 in the 3GPP standard TS 36.213 v14.1.0.

In this application, a network node is an apparatus that has a communication function, and may also be referred to as a network device. The network node may be briefly referred to as a node. For example, the network node may be an apparatus such as a terminal, a base station, or a communications chip.

In this application, transmit power is sometimes referred to as transmit power.

In this application, a field is sometimes referred to as a field (field).

In this application, the term "including" and a variant thereof may refer to non-limitative inclusion; the term "or" and thereof may refer to "and/or"; the terms "associated", "relate to", "corresponding", and variants thereof may refer to "binding", "bound to", "mapping", "configured", "allocated", "based on", "obtained according to", or the like; and the term "by using" and a variant thereof may refer to "utilize", "use", "on which", or the like.

The technical solutions of this application are applicable to communication between different network nodes. For example, the technical solutions are applicable to communication between a base station and a terminal, communication between a base station and a base station, and communication between a terminal and a terminal. In the embodiments of this application, communication between a base station and a terminal is mainly used as an example for description.

The technical solutions of this application may be applied to a wireless communications system shown in FIG. 1. As shown in FIG. 1, the wireless communications system includes a base station B200 and a terminal T100. The base station B200 may communicate with the terminal T100 by using different communication resources (such as B1 or B2). For example, the base station B200 may send data signals to the terminal T100 by using different communication resources. The wireless communications system may be a 4G communications system such as an LTE (long term evolution) system, or a 5G communications system such as an NR (new radio) system, or a communications system integrating a plurality of communications technologies (for example, a communications system integrating an LTE technology and an NR technology).

The terminal T100 is a device that has a wireless communication function, and may be a handheld device that has a wireless communication function, an in-vehicle device, a wearable device, a computing device, another processing device connected to a wireless modem, or the like. The terminal may have different names in different networks, for example, user equipment, a mobile station, a subscriber unit, a station, a cellular phone, a personal digital assistant, a wireless modem, a wireless communications device, a handheld device, a laptop computer, a cordless phone, and a wireless local loop station.

Figure 2:
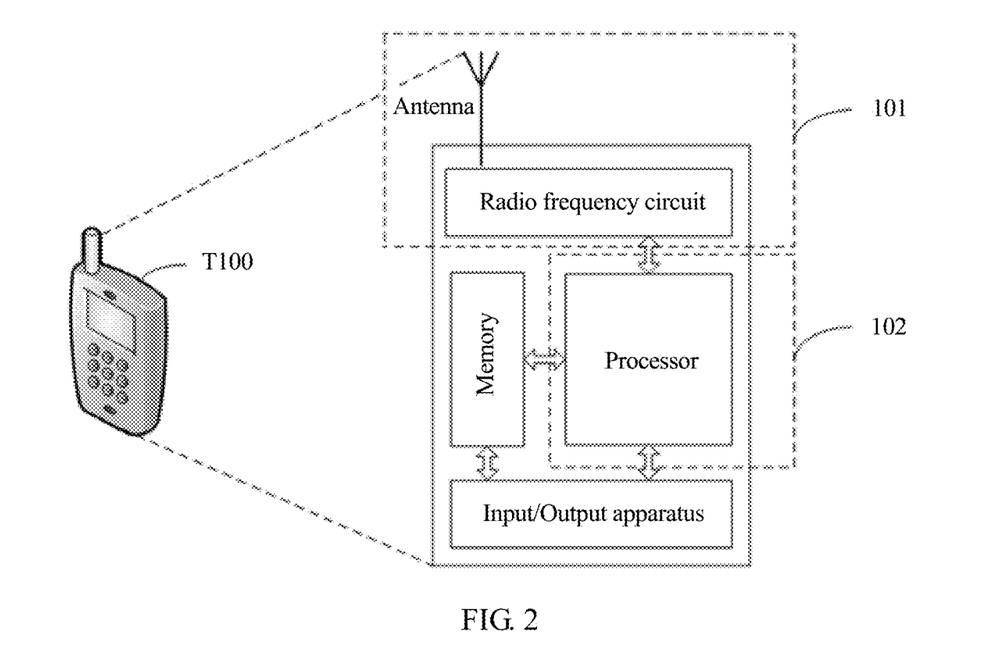
FIG. 2 is a simplified schematic diagram of a structure of a terminal.

A schematic structural diagram of the terminal T100 may be shown in FIG. 2. For ease of description, FIG. 2 shows only main components of the terminal. As shown in FIG. 2, the terminal T100 includes a processor, a memory, a radio frequency circuit, an antenna, and an input/output apparatus. The processor is mainly configured to: process a communications protocol and communication data, control the terminal, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus such as a touchscreen, a display screen, or a keyboard is mainly configured to: receive data entered by a user, and output data to the user. Some types of terminals do not have an input/output apparatus.

After the terminal is powered on, the processor may read the software program in the storage unit, interpret and execute an instruction of the software program, and process the data of the software program. When the processor needs to send data, after performing baseband processing on the to-be-sent data, the processor outputs a baseband signal to the radio frequency circuit. After performing radio frequency processing on the baseband signal, the radio frequency circuit sends a radio frequency signal in an electromagnetic wave form to the outside by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

For ease of description, FIG. 2 shows only one memory and one processor. Actual user equipment may include a plurality of processors and memories. The memory may also be referred to as a storage medium, a storage device, or the like. This is not limited in this embodiment of this application.

In an optional implementation, the processor may include a baseband processor and/or a central processing unit. The baseband processor is mainly configured to process the communications protocol and the communication data. The central processing unit is mainly configured to: control the entire terminal, execute the software program, and process the data of the software program. The processor in FIG. 2 integrates functions of the baseband processor and the central processing unit. A person skilled in the art may understand that the baseband processor and the central processing unit may alternatively be separate processors, and are interconnected by using a technology such as a bus. Optionally, the terminal may include a plurality of baseband processors to adapt to different network standards. Optionally, the terminal may include a plurality of central processing units to enhance a processing capability of the terminal. Optionally, the functions of the baseband processor and the central processing unit may be integrated into one processor for implementation. Optionally, all components of the terminal may be connected by using various buses. The baseband processor may also be expressed as a baseband processing circuit or a baseband processing chip. The central processing unit may also be expressed as a central processing circuit or a central processing chip. Optionally, a function of processing a communications protocol and communication data may be built in the processor, or may be stored in the storage unit in a form of a software program. The processor executes the software program to implement a baseband processing function.

In this embodiment of this application, the antenna that has receiving and transmitting functions and the radio frequency circuit may be considered as a transceiver unit of the terminal, and the processor that has a processing function may be considered as a processing unit of the terminal. As shown in FIG. 2, the terminal T100 includes a transceiver unit 101 and a processing unit 102. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. The receiving unit may also be referred to as a receiver, a receiver, a receiver circuit, or the like, and the sending unit may be referred to as a transmitter, a transmitter, a transmitter circuit, or the like.

The base station B200 may also be referred to as a base station device, and is a device that is deployed in a radio access network to provide a wireless communication function. For example, a base station in an LTE network is referred to as an evolved NodeB (eNB or eNodeB), and a base station in an NR network is referred to as a TRP (transmission reception point) or a gNB (generation nodeB, next generation NodeB). A structure of the base station B200 may be shown in FIG. 3. The base station B200 shown in FIG. 3 may be a separated base station. For example, a distributed base station that includes antennas, a remote radio unit (RRU), and a baseband unit (BBU) is shown on the left of FIG. 3. Alternatively, the base station shown in FIG. 3 may be an integrated base station, such as a small cell shown on the right of FIG. 3. Generally, the base station includes a part 201 and a part 202. The part 201 is mainly configured to: receive and transmit radio frequency signals, and perform conversion between a radio frequency signal and a baseband signal. The part 202 is mainly configured to: perform baseband processing, control the base station, and the like. The part 201 may be usually referred to as a transceiver unit, a transceiver, a transceiver circuit, a transceiver, or the like. The part 202 may be usually referred to as a processing unit. The part 202 is usually a control center of the base station.

Figure 3:
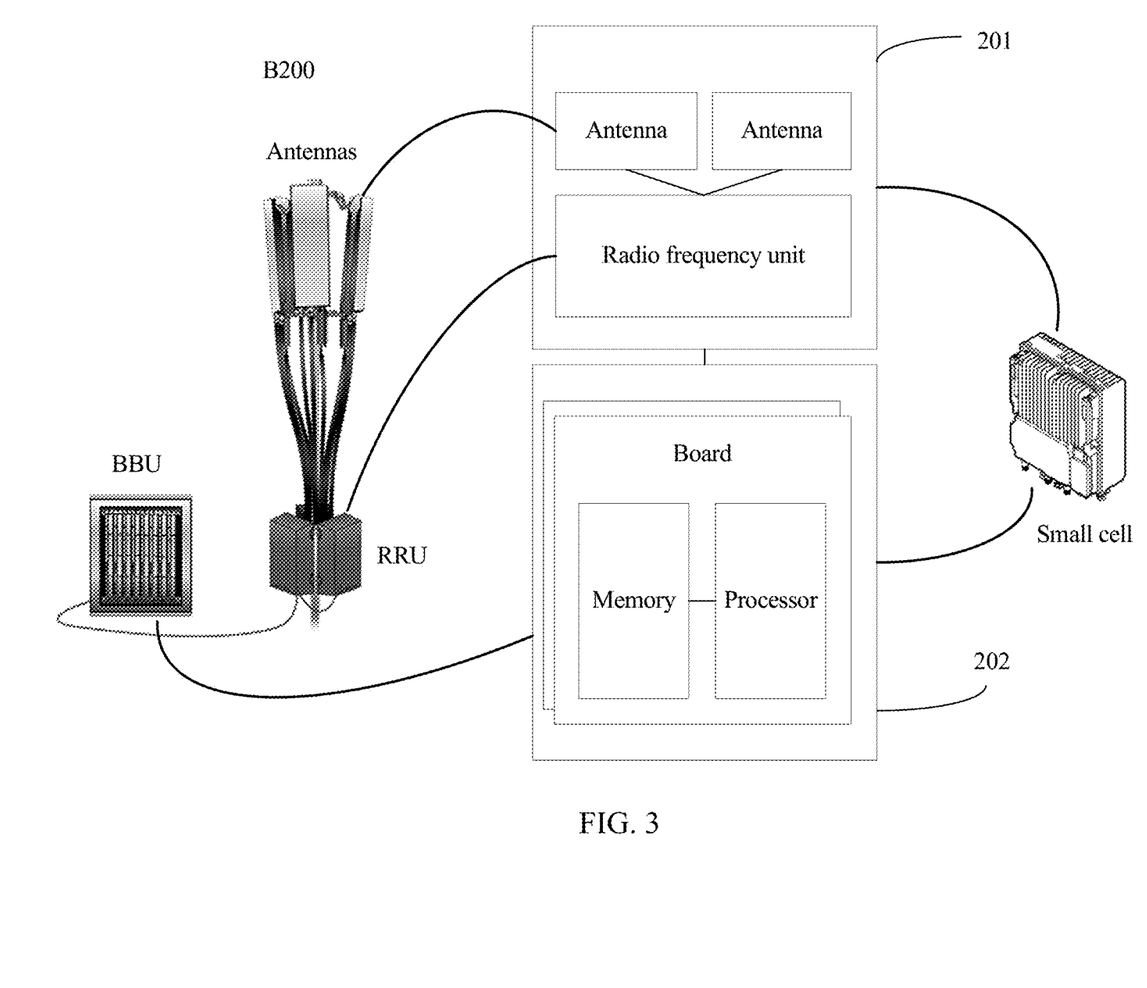
FIG. 3 is a simplified schematic diagram of a structure of a base station.

In an optional implementation, the part 201 may include an antenna and a radio frequency unit. The radio frequency unit is mainly configured to perform radio frequency processing. Optionally, in the part 201, a component configured to implement a receiving function may be considered as a receiving unit, and a component configured to implement a sending function may be considered as a sending unit. In other words, the part 201 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

In an optional implementation, the part 202 may include one or more boards. Each board may include a processor and a memory. The processor is configured to read and execute a program in the memory, to implement a baseband processing function and control on the base station. If a plurality of boards exist, the boards may be interconnected to increase a processing capability.

In another optional implementation, as system-on-chip (SoC for short) technologies develop, a function of the part 202 and a function of the part 201 may be implemented by using the SoC technologies. In other words, a function of the part 202 and a function of the part 201 are implemented by using a base station function chip. Components such as a processor, a memory, and an antenna interface are integrated into the base station function chip. A program of a related function of the base station is stored in the memory, and the processor executes the program to implement the related function of the base station.

The technical solutions of this application are applicable to a scenario in which different communication resources are used for communication, for example, a scenario in which different beams are used for communication, and a scenario in which different ports are used for communication. This embodiment of this application is mainly described by using an example in which a beam is used for communication.

Figure 4:
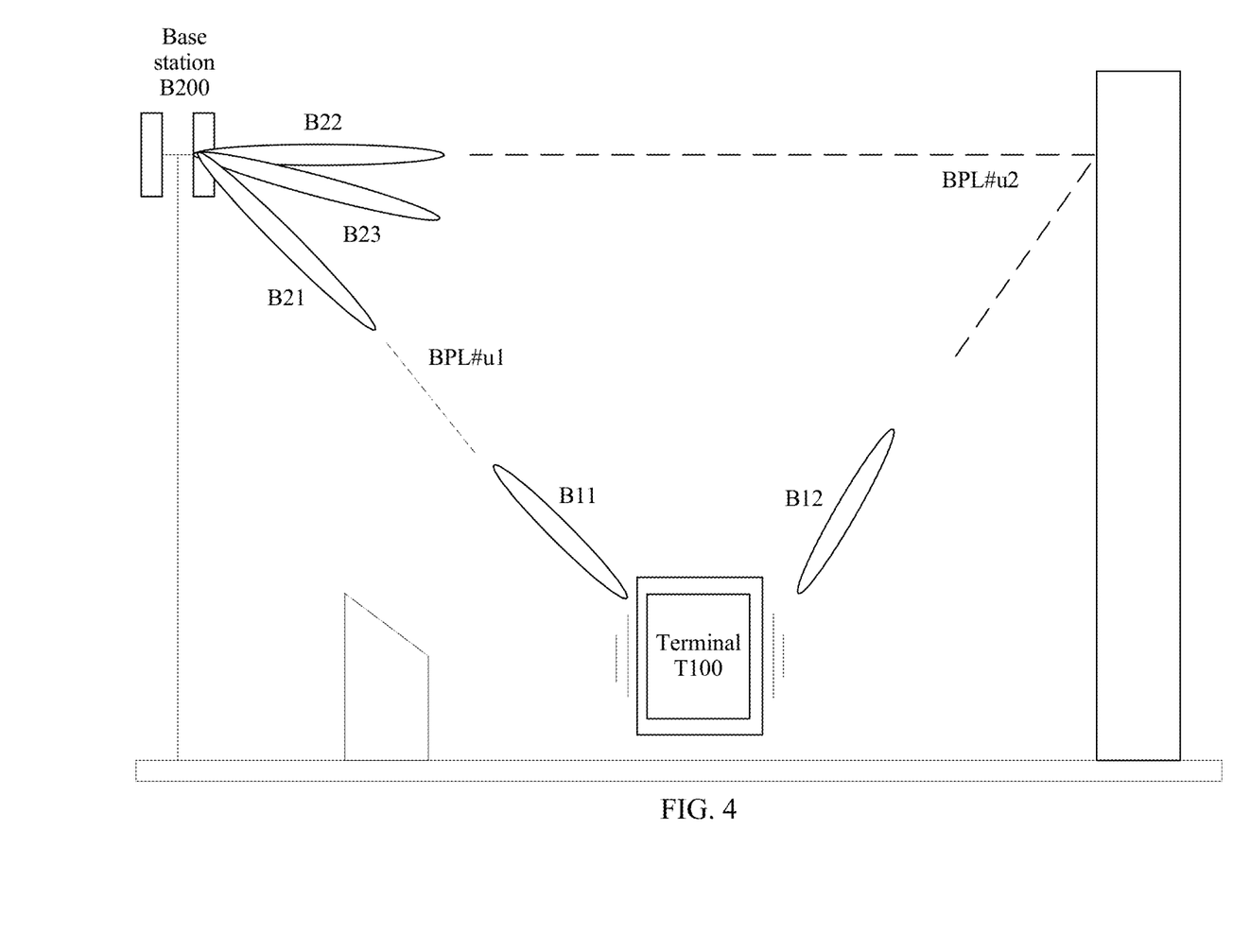
FIG. 4 is a schematic diagram of a beam pair link.

As shown in FIG. 4, a terminal T100 may send a signal to a base station B100 by using beams B11 and B12. The beams B11 and B12 may be referred to as transmit beams of the terminal T100. The base station B200 may receive, by using beams B21 and B22, the signal sent by the terminal T100. The beams B21 and B22 may be referred to as receive beams of the base station B200. A signal sent on the beam B11 may be received by using the beam B21. In this case, it may be considered that there is a beam pair link BPL #u1 between the terminal T100 and the base station B200, and the BPL #u1 has a correspondence with the beam B11 and the beam B21. A signal sent on the beam B12 may be received by using the beam B22. In this case, it may be considered that there is a beam pair link BPL #u2 between the terminal T100 and the base station B200, and the BPL #u2 has a correspondence with the beam B21 and the beam B22. The BPL #u1 and the BPL #u2 may be considered as uplink beam pair links. Similarly, the base station B200 may send a signal to the terminal T100 by using a beam. In this case, downlink beam pair links BPL #d1 and BPL #d2 may exist. Optionally, in a scenario in which there is reciprocity between the uplink beam pair link and the downlink beam pair link, the uplink beam pair link may be considered as the downlink beam pair link, or the downlink beam pair link may be considered as the uplink beam pair link. In a beam management procedure, the base station B200 and the terminal T100 may find and manage a beam pair link that exists between the base station B200 and the terminal T100. The base station B200 and the terminal T100 find that the beam pair link may be implemented through measurement, for example, through uplink measurement or downlink measurement.

Figure 5:
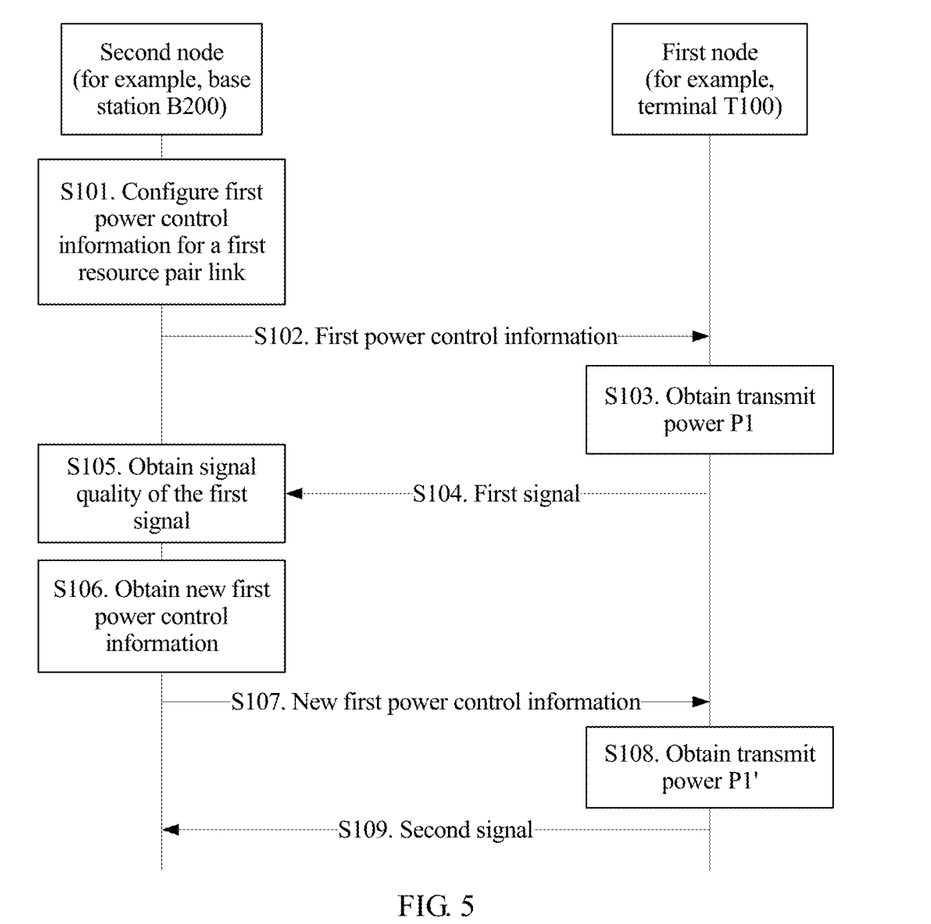
FIG. 5 is a schematic diagram of signaling interaction for power control.

In an interaction process shown in FIG. 5, a first node needs to send a signal to a second node, and the second node may control transmit power of the first node. For example, a terminal T100 needs to send a signal to a base station B200, and the base station B200 may control transmit power of the terminal T100. As shown in FIG. 5, a power control method includes the following steps.

S101. The second node configures first power control information for a first resource pair link.

For example, the base station B200 configures the first power control information for a beam pair link BPL #u1.

Configuring the first power control information for the first resource pair link may be considered as associating the first resource pair link with the first power control information, in other words, a correspondence between the first resource pair link and the first power control information is established.

S102. The second node sends the first power control information to the first node.

For example, the base station B200 sends the first power control information to the terminal T100.

In other words, the first node receives the first power control information from the second node.

For example, the terminal T100 receives the first power control information from the base station B200.

Optionally, after receiving first power information, the first node may locally store the first power control information.

S103. The first node obtains, based on the first power control information, transmit power P1 for sending a signal on a resource corresponding to the first resource pair link.

For example, the terminal T100 needs to send a signal by using a beam B11. The terminal T100 may learn that a beam pair link corresponding to the beam B11 is a BPL #u1, and the terminal T100 may obtain the transmit power P1 by using the first power control information associated with the BPL #u1.

S104. The first node sends a first signal to the second node by using a first transmission resource corresponding to the first resource pair link, where transmit power of the first signal is P1.

For example, the terminal T100 may send an SRS to the base station B200 by using the B11 corresponding to the BPL #u1, where transmit power of the SRS is P1.

In other words, the second node may receive the first signal from the first node by using a first receiving resource corresponding to the first resource pair link.

For example, the base station B200 may receive the SRS from the terminal T100 by using a B21 corresponding to the BPL #u1.

In S102, S103, and S104, when transmitting a signal on resources corresponding to different resource pair links, a network node may use different power control, to be specific, different power control may be performed for different channel features, to achieve an effect that power control matches the channel feature, so that more appropriate transmit power is obtained. In addition, a reference signal, a control signal, and a data signal may be transmitted on the resources corresponding to different resource pair links, so that different power control can be used, without a need to reuse same power control. For different types of signals, power control is implemented based on different channel features. This can better ensure receiving quality and avoid unnecessary interference.

Optionally, the second node may obtain more accurate power control information by using signal quality of the first signal, for example, S105 and S106.

S105. The second node obtains signal quality of the first signal through measurement.

For example, the base station B200 may obtain signal quality information of the first signal through measurement on the first signal.

S106. The second node obtains new first power control information based on the signal quality of the first signal.

For example, the base station B200 obtains, based on the signal quality of the first signal, the new first power control information corresponding to the BPL #u1.

After obtaining the new first power control information corresponding to the first resource pair link, the second node may send the new first power control information to the first node, for example, S107.

S107. The second node sends the new first power control information to the first node.

For example, the base station B200 may send the new first power control information to the terminal T100.

In other words, the first node receives the new first power control information from the second node.

For example, the terminal T100 receives the new first power control information from the base station B200.

Optionally, the second node may locally store the new first power control information.

Optionally, the second node may delete or deactivate the first power control information. An occasion for deleting or deactivating the first power control information is not limited. For example, after a plurality of pieces of power control information associated with a same resource pair link are received, earliest power control information associated with the resource pair link may be deleted.

When needing to send a signal on the resource corresponding to the first resource pair link, the first node may obtain more accurate transmit power by using the new first power control information to transmit the signal, for example, S108 and S109.

S108. The first node obtains, based on the new first power control information, transmit power P1' for sending the signal on the resource corresponding to the first resource pair link.

For example, the terminal T100 may obtain, based on the new first power control information, the transmit power P1' on the B11 corresponding to the BPL #u1.

Optionally, the first node may obtain, based on the new first power control information and the old first power control information, the transmit power for sending the signal on the resource corresponding to the first resource pair link.

S109. The first node sends a second signal to the second node by using the first transmission resource corresponding to the first resource pair link, where transmit power of the second signal is P1'.

For example, the terminal T100 may send an SRS to the base station B200 by using the B11 corresponding to the BPL #u1, where transmit power of the SRS is P1'.

In other words, the second node may receive the second signal from the first node by using the first receiving resource corresponding to the first resource pair link.

For example, the base station B200 may receive the SRS from the terminal T100 by using the B21 corresponding to the BPL #u1.

Power control information associated with a resource pair link is updated based on signal quality, to obtain transmit power that better matches the channel feature.

Based on different nodes, descriptions of the power control method provided in this embodiment of this application are different.

For example, from a perspective of the first node, the power control method provided in this embodiment of this application may include S102, S103, and S104, or may include S102 and S104. Optionally, the method may further include S107. Optionally, the method may further include S108 and S109.

For example, from a perspective of the second node, the power control method provided in this embodiment of this application may include S102 and S104. Optionally, the method may further include S102. Optionally, the method may further include S105 and S106. Optionally, the method may further include S107. Optionally, the method may further include S109.

A person skilled in the art should know that the power control method provided in this application may include some or all of S101 to S109 based on different requirements.

Optionally, in S101, the first power control information may be considered as initial power control information, and the initial power control information may be negotiated by the first node and the second node, or may be specified by a communications standard.

Optionally, in S101, the second node may separately configure power control information for a plurality of resource pair links. For example, the base station B200 may configure the first power control information for the BPL #u1, and configure second power control information for a BPL #u2.

Optionally, in S102, the second node may send, to the first node, the power control information corresponding to the plurality of resource pair links. For example, the base station B200 sends the first power control information and the second power control information to the terminal T100.

Optionally, in S102 or S107, the second node may send the power control information to the first node through a control channel (for example, a physical downlink control channel (PDCCH)). For example, the power control information may be included in control information (for example, downlink control information (DCI)) for transmission.

Optionally, the power control information may be a value (for example, a unit of measurement is [dB]) of power control, or may be an index corresponding to a value of power control (briefly referred to as a power control index). The value of power control may be an accumulated value of power control, or an absolute value of power control. As shown in Table 1 below, the power control information may be information in a first column, information in a second column, or information in a third column. When the power control information is the information of the first column, the first node and the second node need to store information such as information in Table 1. The information in Table 1 may be specified in the communications standard.

TABLE 1

| Index | Accumulated value of power control [dB] | Absolute value of power control [dB] |
|---|---|---|
| 0 | −1 | −4 |
| 1 | 0 | −1 |
| 2 | 1 | 1 |
| 3 | 3 | 4 |

For example, the power control information may be transmission power control (transmission power control, TPC) information of an LTE system. For detailed TPC content, refer to Section 5.1.1.1 of the 3GPP standard TS 36.213 version 14.1.0.

Optionally, in S102, when sending the first power control information, the second node may send identification information of the first resource pair link at the same time, so that the first node can more conveniently identify the first resource pair link associated with the first power control information. In other words, the second node may send an association relationship between the resource pair link and the power control information to the first node. For example, the base station B200 may send the identification information of the BPL #u1 and the first power control information to the terminal T100.

Optionally, identification information of a resource pair link may be an index of the resource pair link (briefly referred to as a resource pair link index), an index of a resource (for example, a receiving resource or a transmission resource) corresponding to the resource pair link (briefly referred to as a resource index, a receiving resource index, or a transmission resource index), an index of another resource pair link that has a quasi co-location relationship with the resource pair link (briefly referred to as a QCL resource pair link index), or an index of another resource that has a quasi co-location relationship with the resource (briefly referred to as a QCL resource index, a QCL receiving resource index, or a QCL transmission resource index). For example, the BPL #u1 and the BPL #u2 have a quasi co-location relationship. After receiving the identification information of the BPL #u1 and the first power control information, the terminal may learn, based on the quasi co-location relationship, that the first power control information is also power control information associated with the BPL #u2. For another example, the B11 and a B12 have a quasi co-location relationship. After receiving identification information of the B11 and the first power control information, the terminal T100 may learn, based on the quasi co-location relationship, that the first power control information is also power control information associated with the B12. Because a transmission resource corresponding to the BPL #u2 is the B12, the terminal T100 may learn that the first power control information is associated with the BPL #u2.

Optionally, two fields may be used in control information (for example, DCI) to carry the identification information of the resource pair link and power control information corresponding to the resource pair link. The two fields may be newly added fields, or may be original fields that are reused.

For example, as shown in Table 2, the two fields are a power control index and a resource pair link index. A length of the power control index field is $\log_2(N)$ bits, where N is a quantity of quantized power adjustment values. A length of the resource pair link index field is $\log_2(M)$ bits, where M is a quantity of resource pair links between a first node and a second node.

TABLE 2

| Field | Length (bits) |
| --- | --- |
| Power control index | $\log_2(N)$ |
| Resource pair link index | $\log_2(M)$ |

For another example, as shown in Table 3, the two fields are a power control index and a QCL transmission resource index. A length of the power control index field is $\log_2(N)$ bits, where N is a quantity of quantized power adjustment values. A length of the QCL transmission resource index is $\log_2(Q)$ bits, where Q is a total quantity of transmission resources of the first node.

TABLE 3

| Field | Length (bits) |
| --- | --- |
| Power control index | $\log_2(N)$ |
| QCL transmission resource index | $\log_2(Q)$ |

Optionally, two fields may be used in control information (for example, DCI) to carry identification information of a plurality of resource pair links and power control information corresponding to the plurality of resource pair links, so that the first node sends a signal by using a plurality of transmission resources corresponding to the plurality of resource pair links.

For example, as shown in Table 4, the two fields are a power control index and a resource pair link index. A length of the power control index field is $P*\log_2(N)$ bits, where N is a quantity of quantized power adjustment values. A length of the resource pair link index field is $P*\log_2(M)$ bits, where M is a quantity of resource pair links between a first node and a second node. P is a quantity of a plurality of resource pair links. A length of each power control index is $\log_2(N)$, and a length of each resource pair link index is $\log_2(M)$. Optionally, it may be agreed that a location of a power control index in the power control index field is the same as a location of a resource pair link index that is in a resource pair link index field and that corresponds to the power control index. For example, a resource pair link index associated with a first power control index is a first resource pair link index in the resource pair link index field, and a resource pair link index associated with a second power control index is a second resource pair link index in the resource pair link index field.

TABLE 4

| Field | Length (bits) |
| --- | --- |
| Power control index | $P*\log_2(N)$ |
| Resource pair link index | $P*\log_2(M)$ |

For example, as shown in Table 5, the two fields are a power control index and a QCL transmission resource index. A length of the power control index field is $P*\log_2(N)$ bits, where N is a quantity of quantized power adjustment values. A length of the QCL transmission resource index is $P*\log_2(Q)$ bits, where Q is a total quantity of transmission resources of the first node. P is a quantity of a plurality of resource pair links. A length of each power control index is $\log_2(N)$, and a length of each QCL transmission resource index is $\log_2(Q)$. Optionally, it may be agreed that a location of a power control index in the power control index field is the same as a location of a QCL transmission resource index that is in a QCL transmission resource index field and that corresponds to the power control index. For example, a QCL transmission resource index associated with a first power control index is a first QCL transmission resource index in the QCL transmission resource index field, and a QCL transmission resource index associated with a second power control index is a second QCL transmission resource index in the QCL transmission resource index field.

TABLE 5

| Field | Length (bits) |
| --- | --- |
| Power control index | $P*\log_2(N)$ |
| QCL transmission resource index | $P*\log_2(Q)$ |

For another example, as shown in Table 6, when there are a relatively large quantity of resource pair links, different resource pair links may be represented in a bitmap (bitmap) manner. In Table 6, a length of a resource pair link bitmap field is M bits. For example, M=5, which indicates that there are five resource pair links between the first node and the second node. A value of the resource pair link bitmap field is "01001", which indicates that resources of a second resource pair link and a fifth resource pair link may be used to send a signal. In this case, P=2. A first power control index in the power control index field corresponds to the second resource pair link, and a second power index in the power control index field corresponds to the fifth resource pair link.

TABLE 6

| Field | Length (bits) |
| --- | --- |
| Power control index | P*log$_2$(N) |
| Resource pair link bitmap | M |

For another example, as shown in Table 7, when there are a relatively large quantity of QCL transmission resources, different QCL transmission resources may be represented in a bitmap manner. In Table 7, a length of a QCL transmission resource bitmap field is Q bits. For example, Q=5, which indicates that the first node has five QCL transmission resources. A value of the QCL transmission resource bitmap field is "01001", which indicates that a second QCL transmission resource and a fifth QCL transmission resource are available. In this case, P=2. A first power control index in the power control index field corresponds to the second QCL transmission resource, and a second power index in the power control index field corresponds to the fifth QCL transmission resource.

TABLE 7

| Field | Length (bits) |
| --- | --- |
| Power control index | P*log$_2$(N) |
| QCL transmission resource bitmap | Q |

Optionally, one field may be used in control information (for example, DCI) to carry power control information corresponding to a plurality of resource pair links, so that the first node sends a signal by using a plurality of transmission resources corresponding to the plurality of resource pair links.

For example, as shown in Table 8, the field is a power control index field. A length of the power control index field is M*log$_2$(N) bits, where N is a quantity of quantized power adjustment values, and M is a quantity of resource pair links between the first node and the second node. A length of each power control index is log$_2$(N). The first node and the second node may each maintain a resource pair link list locally. A same resource pair link has a same location in the list on the first node and the second node. A location of a resource pair link in the list is the same as a location of a power control index associated with the resource pair link in the power control index field. For example, a first power control index in the power control index field corresponds to a first resource pair link in the list, and a second power control index corresponds to a second resource pair link in the list. For example, M=5, which indicates that there are five resource pair links between the first node and the second node. If N=4, each power control index occupies two bits. A value of the power control index field is "0010010000". If "00" indicates that power control is not performed, "0010010000" may be understood that the power control index associated with the second resource pair link is "10", a power control index associated with a third resource pair link is "01", and the first resource pair link, the third resource pair link, and a fourth resource pair link have no associated power control index.

TABLE 8

| Field | Length (bits) |
| --- | --- |
| Power control index | M*log$_2$(N) |

Optionally, there are a plurality of methods for obtaining transmit power based on the power control information.

For example, transmit power $P_{SRS,c}(i)$ of the SRS on a subframe i of a serving cell c may be obtained according to the following formula:

$$P_{SRS,c}(i)=\min\{P_{CMAX,c}(i), 10\log_{10}(M_{SRS,c})+P_{O\_SRS,c}(m)+\alpha_{SRS,c}\cdot PL_c+f_{SRS,c}(i)\}.$$

When a TPC accumulation function is enabled, $f_{SRS,c}(i)=f_{SRS,c}(i-1)+\delta_{SRS,c}(i-K_{SRS})$. When the TPC accumulation function is disabled, $f_{SRS,c}(i)=\delta_{SRS,c}(i-K_{SRS})$. A value of $\delta_{SRS,c}(i-K_{SRS})$ is a value of the TPC indicated in the PDCCH on a nearest i-$K_{SRS}$ subframe, and $f_{SRS,c}(i)$ represents a dynamic power adjustment value during i$^{th}$ SRS transmission. For descriptions of the parameters in the formula, refer to related content of Section 5.1.3.1 of the 3GPP standard TS 36.213 version 14.1.0.

A person skilled in the art should learn that, in the foregoing solution description, the first node may be the terminal T100, and the second node may be the base station B200. Network devices specifically indicated by the first node and the second node may vary with a network or an application scenario.

An embodiment of this application further provides a node, which may be configured as the first node in FIG. 5 to implement the power control method provided in the embodiments of this application. A structure of the node may be shown in FIG. 2. Optionally, the node may be a terminal.

In an optional implementation, the transceiver unit 101 may be configured to implement functions of the first node in S102 and S104. The processing unit 102 may be configured to instruct or control the transceiver unit 101 to implement the functions. Optionally, the processing unit 102 may be configured to implement a function of the first node in S103. Optionally, the transceiver unit 101 may be configured to implement a function of the first node in S107. Optionally, the transceiver unit may be configured to implement a function of the first node in S109. Optionally, the processing unit 102 may be configured to implement a function of the first node in S108.

In another optional implementation, a memory of the first node may be configured to store a program for implementing a function related to power control in FIG. 5. The processing unit 102 is configured to execute the program in the memory to implement the function related to power control.

An embodiment of this application further provides another node, which may be configured as the second node in FIG. 5 to implement the power control method provided in the embodiments of this application. Optionally, the node may be a base station.

In an implementation, a transceiver unit 201 may be configured to implement related functions of the second node in S102 and S104. Optionally, a processing unit 202 may control or instruct the transceiver unit 201 to implement the functions. Optionally, the processing unit 202 may be configured to implement a related function of the second node in S101. Optionally, the processing unit 202 may be configured to implement related functions of the second node in S105 and S106. Optionally, the transceiver unit 201 may be configured to implement a related function of the second node in S107. Optionally, the transceiver unit 201 may be configured to implement a related function of the second node in S109.

In another implementation, a memory of the second node may be configured to store a program for implementing a function related to power control in FIG. 5. The processing unit 102 is configured to execute the program in the memory to implement the function related to power control.

An embodiment of this application further provides a communications system, including the foregoing two nodes. For a structure of the communications system, refer to FIG. 1. A running mechanism of the communications system may be described in related content in FIG. 5.

An embodiment of this application further provides a computer program product, and the program product includes a program for implementing a function related to power control by the first node in FIG. 5.

An embodiment of this application further provides a computer readable storage medium, and the storage medium stores a program for implementing a function related to power control by the first node in FIG. 5.

An embodiment of this application further provides a computer program product, and the program product includes a program for implementing a function related to power control by the second node in FIG. 5.

An embodiment of this application further provides a computer readable storage medium, and the storage medium stores a program for implementing a function related to power control by the second node in FIG. 5.

An embodiment of this application further provides a control signal, including the information shown in any one of Table 2 to Table 8.

A person skilled in the art should know that the foregoing different optional parts/implementations may be combined and replaced based on different network requirements.

According to the power control method, the node, the system, the computer program product, the computer readable storage medium, and the control signal provided in the embodiments of this application, an association relationship is established between power control and a resource pair link, so that power control on a resource pair link granularity can be implemented, different power control can be performed based on different channel features, and more accurate transmit power is obtained. In addition, various signals are transmitted on resources corresponding to different resource pair links, so that different power control values can be set for the various signals. In this way, interference can be reduced while correct reception is performed, and a significant gain may be made on network communication quality.

A beam management process is introduced in an NR system. In the beam management process, a base station may measure a beam transmitted by a terminal to select an appropriate beam. In the beam management process, a behavior of transmitting a beam by the terminal is mainly classified into the following two types:

Type 1: The terminal transmits one or more same transmit beams, and the base station receives the one or more same transmit beams by using a plurality of different receive beams.

Type 2: The terminal transmits a plurality of different transmit beams, and the base station receives the plurality of different transmit beams by using one or more same receive beams.

The first type of behavior may be understood as scanning of a receive beam on a base station side, and the second type of behavior may be understood as scanning of a transmit beam on a terminal side. The two behaviors may also be referred to as a beam scanning process. In the first type of behavior, the plurality of same transmit beams transmitted by the terminal may be considered as one beam. In the second type of behavior, the plurality of same receive beams of the base station may be considered as one beam.

The same transmit beams may be understood as beams with a same transmit angle, different transmit beams may be understood as beams with different transmit angles, the same receive beams may be understood as beams with a same receive angle, and different receive beams may be understood as beams with different receive angles. A person skilled in the art should know that a meaning of "same" herein also includes a meaning of "approximately the same".

For related content of beam management, refer to 3GPP proposals R1-1609415, R1-1700043, R1-1700749, R1-1701718, and R1-1703170.

In the beam scanning process, fairness in beam quality determining needs to be improved.

An embodiment of this application provides a signal transmission method, to improve fairness in beam quality determining in a beam scanning process.

The method S200 includes the following steps.

S210. A terminal obtains first transmit power.

S220. The terminal sends a signal to a base station by using one or more transmit beams, where transmit power of the one or more transmit beams is equal to the first transmit power.

In other words, in S220, the base station receives the signal from the terminal by using one or more receive beams.

In S220, the terminal may transmit a plurality of beams by using same transmit power in the beam scanning process. The base station can measure a transmit beam on a terminal side or a receive beam on a base station side more fairly.

It can be learned that the transmit power of the plurality of transmit beams of the terminal is kept unchanged by using the method in the beam scanning process, so that a scanning result can be fairer.

Optionally, the signal may be an SRS.

Optionally, if the one or more transmit beams in S220 are same transmit beams, the base station receives the signal from the terminal by using a plurality of different receive beams.

Optionally, if the plurality of transmit beams in S220 are different transmit beams, the base station receives the signal from the terminal by using one or more same receive beams.

Optionally, the method may further include the following step before S220.

S215. The terminal receives configuration information from the base station, where the configuration information is used to instruct to perform beam scanning.

In S210, there are various optional designs for the terminal to obtain the first transmit power.

In a first optional design, the terminal may use maximum transmit power supported by the terminal as the first transmit power. In an example, S210 may be expressed as that the terminal obtains the maximum transmit power of the terminal, and S220 may be expressed as that the terminal sends a plurality of beams, where transmit power of the plurality of beams is equal to the maximum transmit power of the terminal.

In a second optional design, the base station may configure transmit power for the terminal. In an example, S210 may be expressed as that the terminal receives the first transmit power from the base station or the base station sends the first transmit power to the terminal. Optionally, the base station may send the first transmit power to the terminal by using RRC signaling, a MAC-CE, or DCI, in other words, the first transmit power is included in the RRC signaling, the MAC-CE, or the DCI that is sent to the terminal.

In a third optional design, the base station may configure one or more parameters for the terminal to obtain the transmit power, and the terminal obtains the first transmit power based on the one or more parameters. The parameter is associated with a BPL. Optionally, the parameter may be one or more of $P_{O\_SRS,BPL}(m)$, $\alpha_{SRS,BPL}$, and $f_{SRS,BPL}$. $P_{O\_SRS,BPL}(m)$ represents a power reference value associated with the BPL, in other words, power reference values of different BPLs may be different. $\alpha_{SRS,BPL}$ represents a path loss compensation factor associated with the BPL, in other words, path loss compensation factors of different BPLs may be different. $f_{SRS,BPL}$ represents a closed-loop power adjustment value associated with the BPL, in other words, closed-loop power adjustment values of different BPLs may be different.

In an example, the method further includes the following step.

S208. The base station sends a power parameter associated with a BPL to the terminal.

S210 may be expressed as follows: The terminal obtains the first transmit power based on the power parameter.

Optionally, the terminal may implement S210 in the following manners, where $P_{SRS,c}$ is used to represent the first transmit power.

$P_{SRS,c}(i) = \min\{P_{CMAX,c}(i), 10 \log_{10}(M_{SRS,c}) + P_{O\_SRS,c}(m) + \alpha_{SRS,c} \cdot PL_c\}$; and    Manner 1:

$P_{SRS,c}(i) = \min\{P_{CMAX,c}(i), 10 \log_{10}(M_{SRS,c}) + P_{O\_SRS,c}(m) + \alpha_{SRS,c} \cdot PL_c + f_{SRS,c}(i)\}$.    Manner 2:

For example, if $P_{O\_SRS,BPL}(m)$ is included in the parameters configured by the base station for the terminal, $P_{O\_SRS,BPL}(m)$ may be used to replace $P_{O\_SRS,BPL}(m)$ in the foregoing manner to obtain the first transmit power. If $\alpha_{SRS,BPL}$ is included in the parameters configured by the base station for the terminal, $\alpha_{SRS,BPL}$ may be used to replace $\alpha_{SRS,c}$ in the foregoing manner to obtain the first transmit power. If $f_{SRS,BPL}$ is included in the parameters configured by the base station for the terminal, $f_{SRS,BPL}$ may be used to replace $f_{SRS,c}(i)$ in the foregoing manner to obtain the first transmit power.

For description of the formula, refer to related content in the foregoing Table 8. Details are not described herein again.

An appropriate beam pair may be selected as the BPL by using the third design.

Optionally, in the third design, if the plurality of transmit beams in S220 are different transmit beams, transmit angles of the plurality of transmit beams may meet a threshold range, for example, the transmit angles are between 15 degrees and 18 degrees.

Optionally, in the third design, if the plurality of receive beams in S220 are different receive beams, receive angles of the plurality of receive beams may meet a threshold range, for example, the receive angles are between 45 degrees and 50 degrees.

A beam is a resource. The foregoing method may also be used in a resource scanning process. Only the beam in the foregoing method needs to be replaced with a resource, the transmit beam is replaced with a transmission resource, the receive beam is replaced with a receiving resource, and the BPL is replaced with a resource pair link. Details are not described herein again.

An embodiment of this application further provides a terminal, configured to implement functions of the terminal in the method S200. A structure of the terminal may be shown in FIG. 2. For example, a processor of the terminal may be configured to obtain first transmit power, and a transceiver of the terminal may be configured to send a signal to a base station by using one or more transmit beams.

An embodiment of this application further provides a base station, configured to implement functions of the base station in the method S200. A structure of the base station may be shown in FIG. 3. For example, a transceiver of the base station may be configured to: send transmit power to a terminal or obtain a parameter of transmit power, and receive a signal from the terminal by using one or more receive beams.

An embodiment of this application further provides a communications system, including the terminal and the base station in the foregoing method S200. For a structure of the communications system, refer to FIG. 1. A running mechanism of the communications system may be described in content of S200.

An embodiment of this application further provides a computer program product, and the program product includes a program for implementing functions of the terminal in the method S200.

An embodiment of this application further provides a computer readable storage medium, and the storage medium stores a program for implementing functions of the terminal in the method S200.

An embodiment of this application further provides a computer program product, and the program product includes a program for implementing functions of the base station in the method S200.

An embodiment of this application further provides a computer readable storage medium, and the storage medium stores a program for implementing functions of the base station in the method S200.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer readable storage medium. The software function unit is stored in a storage medium and includes several instructions for instructing a computer device (which may be a personal computer, a server, or a network device) or a processor to perform some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing apparatus, refer to a corresponding process in the foregoing method embodiments, and details are not described herein again.

A person of ordinary skill in the art may understand that first, second, and various reference numerals in this specification are for distinguishing only for ease of description, and are not used to limit a scope of the embodiments of this application.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded onto and executed on the computer, all or some of the procedures or functions according to the embodiments of the present invention are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a Solid State Disk (SSD)), or the like.

Finally, it should be noted that the foregoing embodiments are merely intended for describing the technical solutions of this application rather than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of this application.

The invention claimed is:

1. A signal transmission method comprising:
   receiving, by a terminal and from a base station, a power parameter associated with a beam pair link;
   determining, by the terminal, transmit power of a terminal based on the power parameter received from the base station; and
   sending a sounding reference signal (SRS) to the base station by using the first transmit power and a plurality of beams,
   wherein the power parameter is one or more of $P_{O\_SRS,BPL}(m)$, $\alpha_{SRS,BPL}$ and $f_{SRS,BPL}$, wherein $P_{O\_SRS,BPL}(m)$ represents a power reference value associated with a beam pair link (BPL), $\alpha_{SRS,BPL}$ represents a path loss compensation factor associated with the BPL and $f_{SRS,BPL}$ represents a closed-loop power adjustment value associated with the BPL.

2. The method according to claim 1, further comprising receiving, by the terminal, configuration information for performing beam scanning.

3. The method according to claim 1, wherein determining the transmit power of the terminal includes determining that the transmit power of the terminal is a maximum transmit power of the terminal.

4. The method according to claim 1, wherein the transmit power is a first transmit power and the method further comprises:
   receiving, by the terminal, a second transmit power from the base station; and
   wherein determining the first transmit power of the terminal includes determining that the first transmit power of the terminal is the received second transmit power.

5. The method according to claim 1, wherein the terminal determines the transmit power of the terminal of the SRS on a subframe of a serving cell associated with the base station based on the power parameter.

6. An apparatus, wherein the apparatus comprises a processor; and
   the processor is coupled to a memory, reads one or more instructions in the memory, and executes the one or more instructions, so that the apparatus implements the method according to claim 1.

7. The apparatus according to claim 6, wherein the apparatus further comprises the memory.

8. A non-transitory computer readable storage medium comprising one or more instructions, wherein when the one or more instructions is executed by a computer, the computer is enabled to perform the method according to claim 1.

9. A signal transmission method comprising:
   sending, by a base station, transmit power information used to determine a transmit power to a terminal, wherein the transmit power information enables the terminal to send a sounding reference signal (SRS) by using the transmit power information and a plurality of beams, and wherein the transmit power information includes a power parameter that is one or more of $P_{O\_SRS,BPL}(m)$, $\alpha_{SRS,BPL}$ and $f_{SRS,BPL}$, wherein $P_{O\_SRS,BPL}(m)$ represents a power reference value associated with a beam pair link (BPL), $\alpha_{SRS,BPL}$ represents a path loss compensation factor associated with the BPL and $f_{SRS,BPL}$ represents a closed-loop power adjustment value associated with the BPL;

receiving the SRS; and sending, by the base station, configuration information to the terminal, wherein the configuration information enables the terminal to perform beam scanning.

10. The method according to claim 9, wherein the power parameter is used by the terminal to determine transmit power of the SRS on a subframe of a serving cell associated with the base station.

11. An apparatus, wherein the apparatus comprises a processor; and the processor is coupled to a memory, reads one or more instructions in the memory, and executes the one or more instructions, so that the apparatus implements the method according to claim 9.

12. The apparatus according to claim 11, wherein the apparatus further comprises the memory.

13. A non-transitory computer readable storage medium comprising one or more instructions, wherein when the one or more instructions is executed by a computer, the computer is enabled to perform the method according to claim 9.

14. A first node comprising a processor and a transceiver, wherein the processor is configured to cooperate with the transceiver to:

receive, from a second node, control information comprising (i) first power control information associated with a first resource pair link and identification information of the first resource pair link and (ii) second power control information associated with a second resource pair link and identification information of the second resource pair link; and send a first signal to the second node by using a first transmission resource corresponding to the first resource pair link, wherein a transmit power of the first signal is based on the first power control information.

15. The first node according to claim 14, wherein the processor is further configured to send a second signal to the second node by using the transceiver and the first transmission resource, wherein the first power control information is associated with a signal quality of the second signal.

16. The first node according to claim 14, wherein the identification information of the first resource pair link is an index of one of the following:
a) the first resource pair link,
b) the first transmission resource,
c) a third resource pair link that has a quasi co-location relationship with the first resource pair link, or
d) a third resource that has a quasi co-location relationship with the first transmission resource.

17. The first node according to claim 14, wherein the first resource pair link is a beam pair link.

18. The node according to claim 17, wherein the first node is a terminal.

* * * * *

UNITED STATES PATENT AND TRADEMARK OFFICE
CERTIFICATE OF CORRECTION

PATENT NO. : 10,917,895 B2
APPLICATION NO. : 16/523709
DATED : February 9, 2021
INVENTOR(S) : Tang et al.

Page 1 of 1

It is certified that error appears in the above-identified patent and that said Letters Patent is hereby corrected as shown below:

In the Claims

Claim 1, Column 24, Line 24: "by using the first transmit" should be -- by using the transmit --.

Claim 8, Column 24, Line 61: "A non-transitory computer readable" should read -- A computer readable --.

Claim 13, Column 25, Line 30: "A non-transitory computer readable" should read -- A computer readable --.

Signed and Sealed this
Fifth Day of July, 2022

Katherine Kelly Vidal
*Director of the United States Patent and Trademark Office*